Feb. 6, 1968  D. M. KERR ET AL  3,367,474
CONVEYOR APPARATUS
Filed Oct. 8, 1965  3 Sheets-Sheet 1
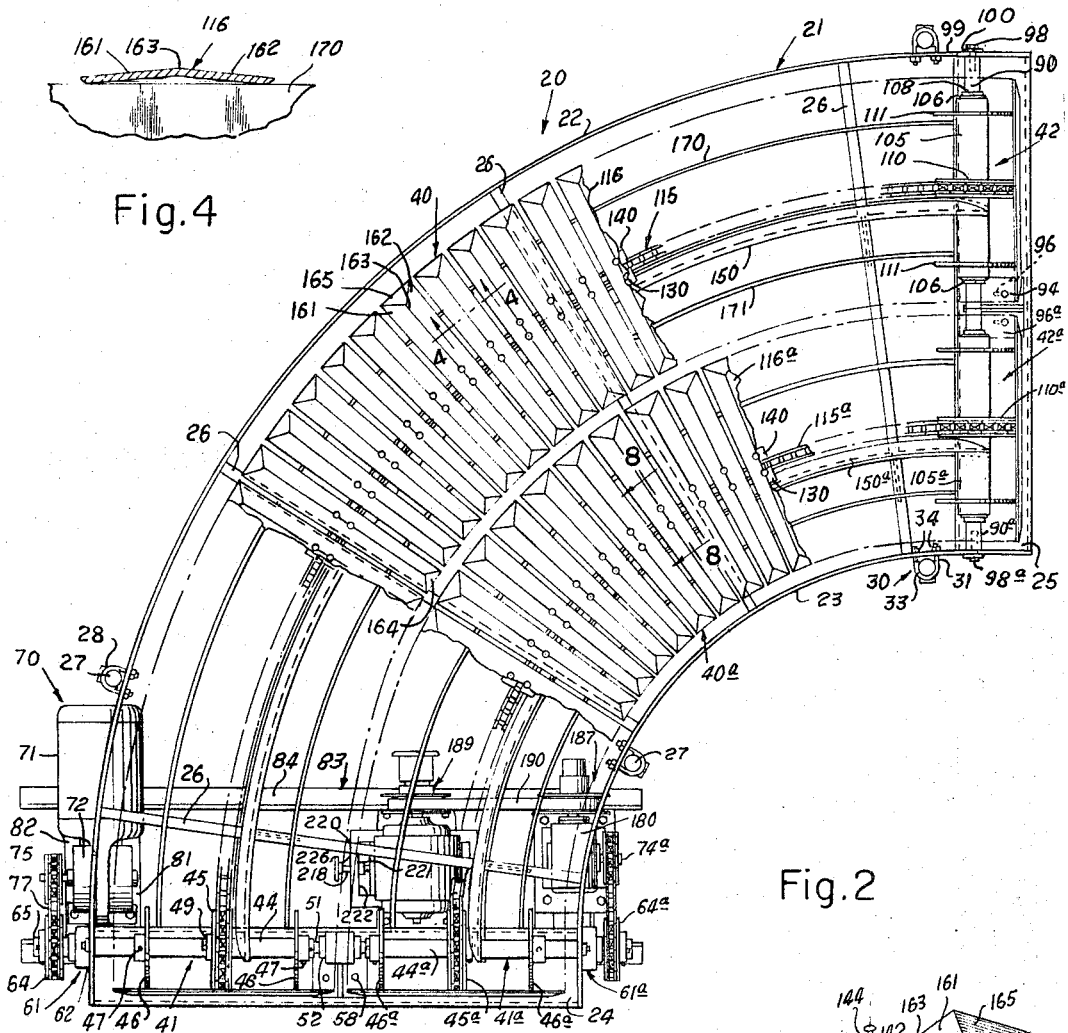
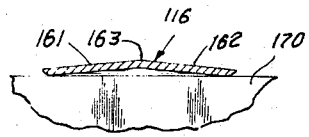
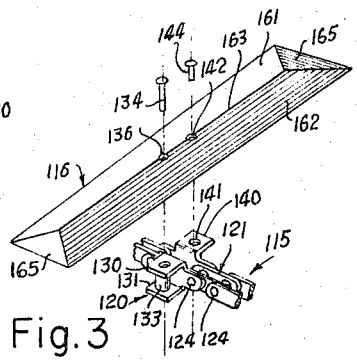
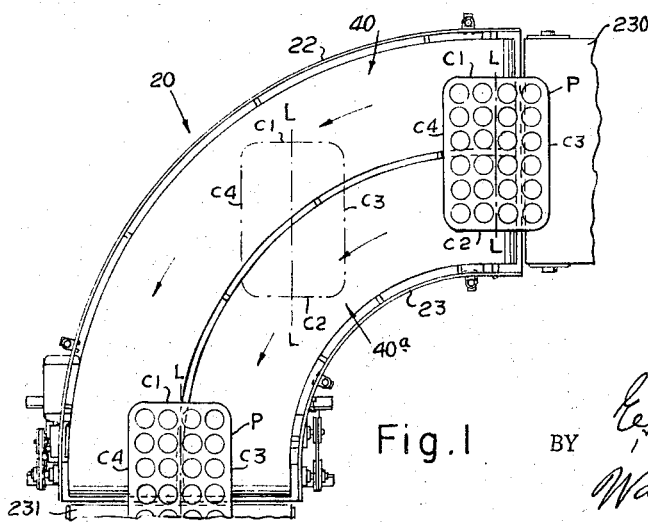
INVENTORS
Douglas M. Kerr
Donald W. Green
BY
ATTORNEYS INVENTORS
Douglas M. Kerr
Donald W. Green

ATTORNEYS

INVENTORS
Douglas M. Kerr
Donald W. Green

BY
ATTORNEYS

United States Patent Office 3,367,474
Patented Feb. 6, 1968

3,367,474
CONVEYOR APPARATUS
Douglas M. Kerr, 1005 Cumberland Place, and Donald W. Green, 526 Fairview Drive, both of Richardson, Tex. 76105
Filed Oct. 8, 1965, Ser. No. 494,206
18 Claims. (Cl. 198—33)

ABSTRACT OF THE DISCLOSURE

A conveyor apparatus having a pair of conveyors mounted for movement in parallel paths whose speeds are adjustable to cause articles transported by the conveyor apparatus to be oriented in a predetermined manner during their transport by the conveyor apparatus.

---

This invention relates to article handling apparatus and more particularly to a conveyor apparatus for transporting articles and rotating the articles during their transport thereby.

An object of this invention is to provide a conveyor apparatus for transporting articles, such as pans and the like, between spaced locations and changing the position of the articles during their transport thereby.

Another object is to provide a conveyor apparatus having a pair of conveyors mounted for movement in parallel paths with the articles being transported thereby being supported by both conveyors and with one conveyor moving relative to the other to cause the article to be rotated through a predetermined angle during its transport from one location to the other by the apparatus.

Still another object is to provide a conveyor apparatus wherein the speed of at least one of the conveyors is variable within a predetermined range.

Still another object is to provide a conveyor apparatus wherein the areas of contact of articles with the conveyors are relatively small to reduce the friction therebetween and facilitate movement of the articles on the conveyors during their rotation.

A further object is to provide a conveyor apparatus having a pair of conveyors wherein the upper portions of the conveyors move in the same direction but at different speeds and wherein the support surfaces of the conveyors slope downwardly towards each other whereby articles carried by the conveyors are supported at outermost bottom edges thereof.

A still further object is to provide a conveyor apparatus whose support surfaces have upper arcuate paths of movement having a common center of curvature and slope downwardly and inwardly toward one another so that articles carried by the conveyors contact each conveyor at a plurality of spaced locations.

A still further object of the invention is to provide a conveyor apparatus having a support frame provided at its opposite ends with pairs of drive and idler assemblies about which a pair of conveyors extend and about which they are movable, wherein each of the conveyors has a draw member and transverse support members secured to the draw member, the apparatus having arcuate guide means engageable with the draw members for guiding movement of the conveyors in arcuate paths.

Another object is to provide a new and improved conveyor having a draw member to which are secured a plurality of support members which extend transversely of the draw member and which have upper support edges and side sections which extend divergently from the support edges toward the draw member.

Still another object is to provide a conveyor whose draw member is provided with friction reducing means for engaging guide means which guide the movement of the conveyor.

Additional objects and advantages of the invention will be readily apparent from the reading of the following description of a device constructed in accordance with the invention, and reference to the accompanying drawings thereof, wherein:

FIGURE 1 is a top schematic view of the conveyor apparatus embodying the invention, showing it in use transporting articles from a feed conveyor to a pick-up conveyor;

FIGURE 2 is a top partly schematic view, with some parts broken away, of the conveyor apparatus;

FIGURE 3 is an exploded fragmentary view showing a conveyor draw member and a support member which is secured thereto;

FIGURE 4 is an enlarged sectional view taken on line 4—4 of FIGURE 2;

Figure 5:
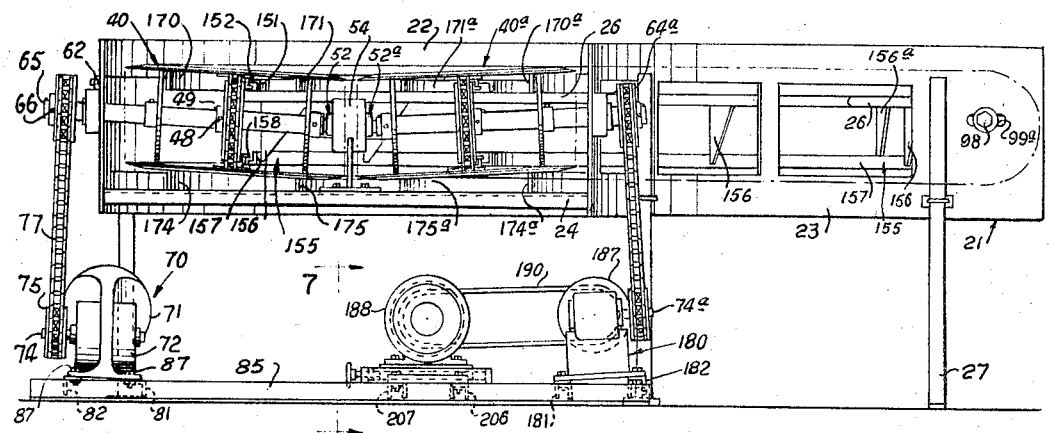
FIGURE 5 is a vertical view of one end of the conveyor apparatus with some portions of the conveyors removed.
Figure 6:
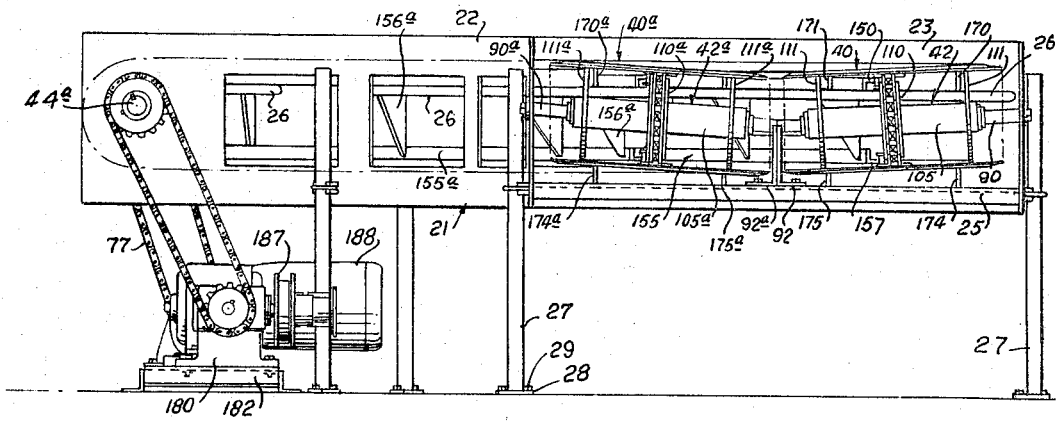
FIGURE 6 is a similar view of the other end of the conveyor apparatus.
Figure 12:
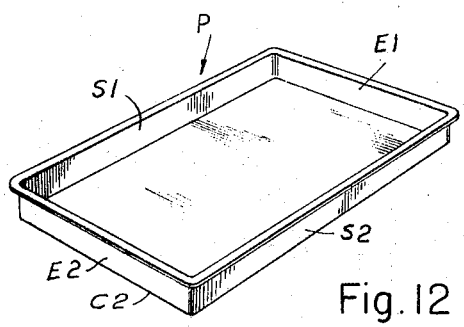
Figure 7:
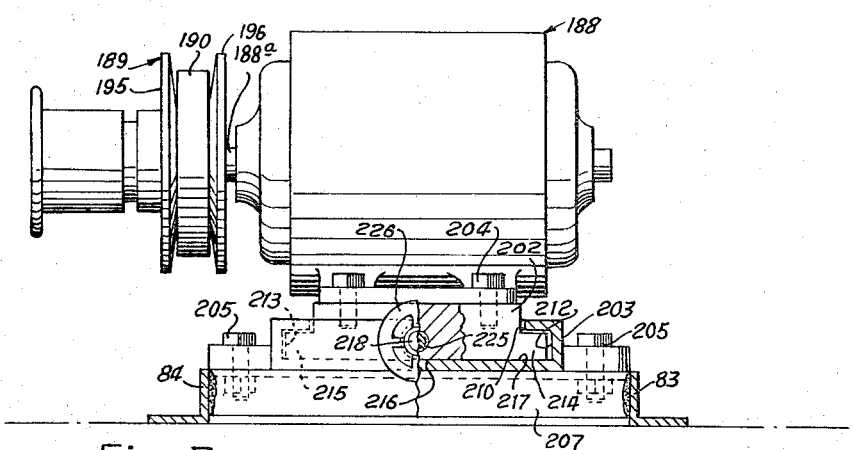
FIGURE 7 is an enlarged side view with some parts broken away showing adjustable mounting of the drive motor of one of the conveyors.
Figure 8:
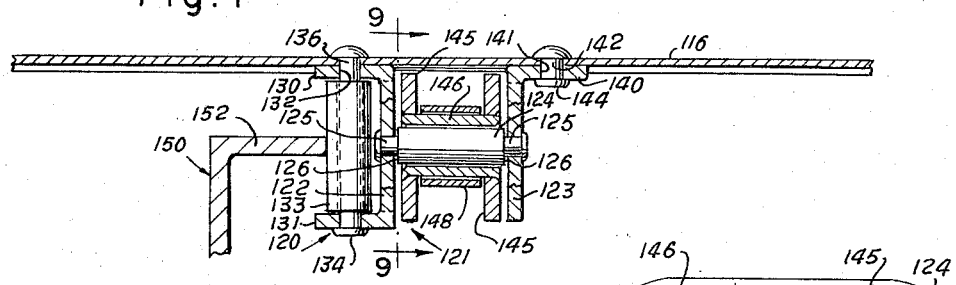
FIGURE 8 is a sectional view taken on line 8—8 of FIGURE 2.
Figure 9:
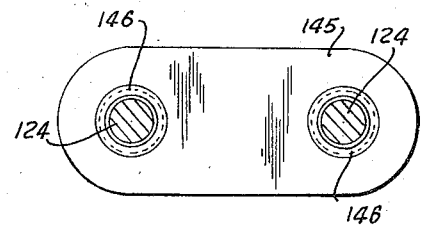
FIGURE 9 is a sectional view taken on line 9—9 of FIGURE 8.
Figure 10:
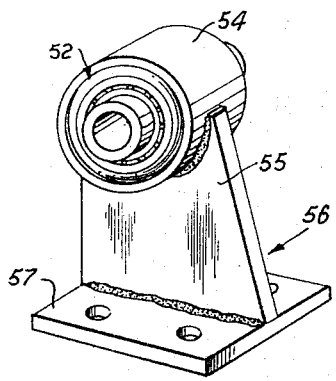
FIGURE 10 is a perspective view of a bracket and roller bearing assembly of the apparatus.
Figure 11:
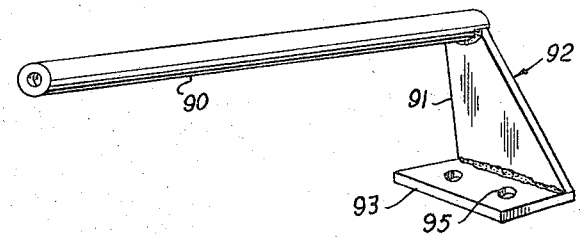
FIGURE 11 is a perspective view of a shaft and bracket assembly of the apparatus; and, FIGURE 12 is a perspective view of a pan which may be transported by the apparatus.

Referring now to the drawings, the apparatus 20 for transporting articles and changing the orientation thereof during their transport thereby, includes a support frame 21 having a pair of parallel arcuate side walls 22 and 23 which are preferably in the form of substantially 90 degree segments of concentric cylinders. The side walls at their front and rear ends are connected by front and rear channel members 24 and 25 which extend between the side walls adjacent their bottom edges and are rigidly secured to the side walls in any suitable manner, as by welding. The side walls are also connected to one another by a plurality of tubular connector members 26, which may be pieces of steel pipe, whose longitudinal axes preferably intersect the axis of curvature of the side walls. The connector members are also rigidly secured at their ends of the side walls by welding.

The frame 21 is mounted on a plurality of vertical posts or columns 27 whose planar foot plates 28 are adapted to rest on a supporting structure and be rigidly secured thereto in any suitable manner, as by bolts 29 which extend through suitable apertures in the foot plates. The frame side walls are rigidly connected to the posts by means of clamp assemblies 30 each of which includes a spacer block 31 whose inner vertical surface abuts the outer surface of a frame wall and whose outer surface is provided with a vertical arcuate recess in which is received a post column 27. Each clamp assembly also includes a U-bolt 33 which extends about the post and the spacer member, its free ends extending through suitable apertures in the wall and being secured against withdrawal therefrom by nuts 34 threaded thereon.

An outer endless conveyor 40 is mounted on the support frame between the side walls and adjacent the outer side wall for movement in an arcuate continuous path by a means of a front drive assembly 41 and a rear idler assembly 42. The front drive assembly 41 includes a drive shaft 44 on which is rigidly secured a sprocket 45 and a pair of spacer discs 46. The guide discs 46 may be rigidly secured in any longitudinally adjusted position on the drive shaft 44 by means of set screws 47 threaded in suitable bores in the hubs of the guide discs. The sprocket is held in any longitudinally adjusted position on the drive shaft by a set screw 48 and against rotation thereon by a key 49 which is disposed in aligned longitudinal recesses of the shaft and the hub.

The reduced inner end portion 51 of the drive shaft extends into the inner race of a suitable self-aligning ball bearing assembly 52. The outer surface of the housing of the ball bearing assembly is spherical so that it may be press fitted into one end of a tubular sleeve 54 with the central longitudinal axis of its races substantially parallel to the longitudinal axis of the drive shaft. The tubular sleeve is welded to a vertical plate 55 of a bracket 56 whose horizontal foot plate 57 rests on the front member 24 of the frame and is rigidly secured thereto by means of bolts 58 which extend through aligned apertures in the bracket foot plate and the front frame member 24. The outer end portion of the drive shaft extends through a suitable aperture in the outer side wall 22 and a suitable bearing assembly 61 whose housing is secured to the side wall 22 by means of bolts 62. The bearing assemblies 52 and 61 are of the self-aligning type and are employed in order to permit the longitudinal axis of the shaft to extend at an angle of approximately five degrees to the horizontal as illustrated in the drawings, even though the central longitudinal axes of the sleeve 54 and of the housing of the bearing 61 extend horizontally and are spaced vertically from one another.

The drive shaft outwardly of the side wall 22 has a sprocket 64 secured thereto against rotation thereon by a key 65 received in aligned longitudinal recesses of the shaft and the sprocket hub and against longitudinal movement thereon by a set screw 66 which extends through a threaded bore of its hub to engage the drive shaft.

The drive shaft is rotated by a suitable prime mover assembly 70 which may include an electric motor 71 and a speed reducing transmission 72 driven by the motor. The output shaft 74 of the speed reducing transmission has a sprocket 75 rigidly secured thereto and disposed in alignment with the drive shaft sprocket 64. A chain 77 extends about the two sprockets whereby rotation of the output shaft 74 causes rotation of the drive shaft 44.

In order that the longitudinal axis of the output shaft 74 of the speed reducing transmission be parallel to the longitudinal axis of the drive shaft and the sprockets 64 and 75 be in proper alignment, the base of the prime mover assembly 70 is mounted on the parallel channel members 81 and 82 of a rectangular base 83. The channel members 81 and 82 extend between and are rigidly secured as by welding to the parallel angle members 84 and 85. The top surfaces of the base channel members lie in an upwardly and outwardly inclined plane, as seen in FIGURE 5. The prime mover assembly is rigidly secured to the base channel members 81 and 82 by means of bolts 87.

The idler assembly 42 includes a shaft 90 whose inner end is rigidly secured by welding to the vertical plate 91 of a bracket 92 whose horizontal foot plate 93 rests upon and is rigidly secured to the rear frame channel member 25 by means of bolts 94. The bolts extend through suitable apertures 95 of the foot plate and elongate slots 96 of the rear frame member 25. The outer end of the idler assembly shaft is provided with a threaded bore in which is received a bolt 98 which extends through an elongate horizontal slot 99 of the outer side wall 22. The washer 100 is interposed between the head of the bolt 98 and the outer surface of the outer wall. It will be apparent that due to the provision of means for adjustably securing the opposite ends of the idler assembly shaft 90 to the frame, the shaft can be moved within a predetermined range toward and away from the drive shaft 44. The longitudinal axis of the drive shaft 90 is also inclined at an angle of approximately 5 degrees relative to the horizontal.

The idler assembly 42 includes a sleeve 105 which is rotatably mounted on shaft in any longitudinally adjustable position thereon by a pair of roller bearing assemblies 106 whose housings are press-fitted into opposite ends of the sleeve and whose inner races are rigidly secured to the shaft in any suitable manner, as by set screws 108. A sprocket 110 and a pair of guide discs 111 disposed on opposite sides and spaced from the sprocket 110, are rigidly secured to the sleeve 105 in any suitable manner, as by welding.

The outer conveyor 40 includes a continuous conveyor chain or draw member 115 which extends about the sprockets 45 and 110 and a plurality of support members 116 secured to the draw member at their central portions which extend transversely relative thereto. The draw member 116 includes a plurality of outer link assemblies 120 and a plurality of inner link assemblies 121. Each inner link assembly extends between and connects adjacent ends of a pair of outer link assemblies. Each of the outer link assemblies includes inner and outer elongate vertical plates 122 and 123 rigidly connected adjacent their ends by connector pins 124. The reduced end portions 125 of the connector pins extend through aligned apertures adjacent the ends of the vertical plates with the annular shoulders 126 of the connector pins abutting the inner surfaces of the vertical plates 122 and 123 to limit their inward movement toward one another and with the outer ends of the reduced end portions peaned to secure the pins to the plates.

The inner plates 122 are provided intermediate their ends with top and bottom flanges 130 and 131 which have aligned vertical apertures 132 therein. A tubular bushing 133 of a suitable hard low friction substance is disposed between the flanges and is held against displacement therefrom by a rivet 134 which extends through the apertures of the horizontal flanges 130, the tubular member and an aperture 136 of a transverse support member 116 which extends transversely over each outer link. The bottom end of the rivet is upset in the usual manner to secure the support member to the flanges 130 and 131.

The outer vertical plates 123 of the outer link assemblies are provided with upper laterally outwardly extending horizontal flanges 140 having apertures 141 which are aligned with the apertures 142 of the support members which extend across the outer link assemblies through which extends a rivet 144 which rigidly secures the support members to the upper horizontal flanges 140.

Each of the inner link assemblies includes a pair of elongate vertical plates 145 connected adjacent their ends by tubular connector members 146 which extend through aligned pairs of apertures in the vertical plates and are rigidly secured to the plates in any suitable manner as by swedging of the end portion of the tubular connector members. The connector pins 124 of the outer link assemblies connected by an inner link assembly extend through the tubular connector members 146 of the inner link assembly.

Since the connector pins 124 are smaller in diameter than the internal diameter of the tubular connector members 146 and the internal surfaces of the vertical plates 122 and 123 are spaced from the external surfaces of the plates 145, the inner and outer link assemblies are pivotal relative to each other not only about the axes of the connector pins 124 but also about vertical axes to a limited degree to enable the draw member to travel in the horizontal arcuate path illustrated in the drawings. The draw member 115 is guided in the top horizontal arcuate forward portion of its path of movement from the idler sprocket 110 toward the drive sprocket 45 by an upper arcuate guide 150 whose perpendicular flange 151 rests upon the frame connector members 26 and is rigidly secured thereto by welding. The horizontal flange 152 of the guide extends outwardly toward the outer side wall to engage the bushings 133 of the draw member. The draw member is guided in the bottom arcuate portion of its path of movement from the drive sprocket to the idler sprocket by a similar arcuate guide 155 which is rigidly secured to the frame connector members 26 by gusset plates 156 welded to the frame connector members and the vertical flange 157 of the lower arcuate guide. The horizontal flange 158 of the lower guide also engages the bushings 133. The lower arcuate guide is positioned closer to the outer side wall 22 since, due to the inclination of the drive shaft 44 and the idler assembly shaft 90, the lower portion of the conveyor draw member traveling rearwardly between the drive sprocket and the idler sprocket is displaced outwardly relative to its upper portion traveling forwardly between the idler sprocket and the drive sprocket.

The support members 116 have side sections 161 and 162 which slope downwardly from the longitudinal edge 163 thereof and outwardly and downwardly sloping gusset end sections 165 so that the support members are of substantially inverted trough shape. The support members are tapered, their widths decreasing progressively from their outer ends to their inner ends so that the spaces between adjacent side edges of adjacent support members are substantially uniform in width throughout their lengths.

The upper portion of the conveyor between the drive and idler sprockets 45 and 110 is supported by a pair of outer and inner upper support bars 170 and 171 disposed on opposite sides of and spaced from the draw member. The support bars rest upon and are rigidly secured, as by welding, to the frame connector members 26. Front end portions of the arcuate support bars extend between the guide discs 46 of the drive assembly 42 and their rear end portions and extend between the guide discs 111 of the idler assembly 42. The top edge surface of the outer support bar 170 is substantially coplanar with the uppermost portions of the peripheral surfaces of the outer guide discs 46 and 111 which are proximate to the outer side wall 22. The top edge surface of the inner support bar 171 is coplanar with the uppermost portions of the peripheral surfaces of the inner guide discs 46 and 111 which are proximate to the inner side wall 23. Since the side sections of the support members slope downwardly from its top middle edge 163, only their bottom edge surfaces slide on the top edge surfaces of the support bars and the areas of contact of the support members and the support bars are very small thereby minimizing the sliding friction therebetween.

The lower portion of the conveyor between the drive sprocket and the idler sprocket is supported by similar outer and inner lower arcuate support bars 174 and 175 whose opposite ends extend over the frame end members 24 and 25 and are rigidly secured thereto as by welding. The front end portions of the lower support bars extend inwardly below between the guide discs 46 and their rear end portions extend inwardly between the guide discs 111. The upper edge surface of the outer lower support bar is spaced below the lowermost portions of the peripheral surfaces of the outer guide discs 46 and 111, a distance substantially equal to or slightly greater than the height of the support members 116. The support members engage the top edge surfaces of the lower support bars only at their longitudinal edges and the areas of contact of the support members with the support bars are very small so that the sliding friction therebetween is low. The outer upper and lower spacer bars 170 and 174 are of greater height than the inner upper and lower support bars 171 and 175 since the support members slope downwardly and inwardly from the outer side wall due to the inclination of the axes of the drive and idler shafts and of the sprockets mounted thereon.

The peripheral surfaces of the guide discs 46 engage the side edges of each support member as the outer link assembly of the draw member to which it is attached is engaged by the drive sprocket 45 and is moved downwardly and then rearwardly to prevent the support members from moving in undesired directions after they have lost contact with the upper support bars and before they contact the lower support bars.

The inner conveyor 40a, its drive and idler assemblies 41a and 42a and the frame guides and support bars which guide and support it, are similar in structure and function to the conveyor 40 and the structure associated therewith, and, accordingly, the components of the conveyor 40a, its drive and idler assemblies and its guides and support bars have been provided with the same reference characters, to which the subscript "a" has been added, as the corresponding elements of the conveyor 40, its drive and idler assemblies and its guides and support bars.

The outer upper and lower support bars 170a and 174a are of shorter height than the upper and lower inner support bars 171a and 175a since, due to the inclination of the axes of the drive shaft 44a, the idler shaft 90a, and of the sprockets 45a and 110a, the support members 116a of the conveyor at the upper and lower portions of the conveyor between the drive and idler sprockets 45a and 110a extend downwardly and inwardly from the side wall 23 of the frame. The longitudinal central edges 163 and 163a of the support members 116 and 116a of the upper portions of the conveyors 40 and 40a between their drive and idler sprockets do not lie in a common horizontal plane but in segments of conical planes which intersect or meet at an arcuate line between the adjacent inner ends of the support members of the two conveyors. A planar rectangular object, such as a pan P, supported by the two conveyors therefore engages the edges 163 of two support members 116 at two locations and the edges 163a of two support members 116a at two locations as will be explained more fully below.

The sprocket 64a of the drive shaft 44a is connected to the output shaft 74a of a speed reducing transmission 180 mounted on a pair of parallel transverse channel members 181 and 182 of the base 83 which extend between and are welded to the angle members 84 and 85 of the base 83. The top surfaces of the base channel members 181 and 182 lie in an upwardly inclined plane so that the axes of the shafts 74a and the shaft 44a and the sprockets 45a and 110a secured thereto are parallel. The speed reducing transmission 180 has a suitable V-groove pulley 187 secured thereto. The drive shaft 188a of an electric motor 188 has a variable speed V-groove pulley 189 mounted thereon and a V-belt 190 extends about the pulleys 187 and 189 and is disposed in the peripheral grooves thereof. The variable speed pulley 189 may be of any suitable type, as, for example, a pulley commercially available from the Reeves Pulley Company of Columbus, Ind., and designated No. 96. The variable speed pulley has a movable disc 195 biased toward a fixed disc 196 so that if the motor and the variable speed pulley are moved toward the pulley 187 and the movable disc moves toward the fixed disc, the belt 190 moves outwardly in the groove of the pulley and the radius of the line of effective contact of the V-belt with the pulley, and therefore the speed of movement of the belt 190, is increased. Conversely, if the motor and the variable speed pulley 189 are moved away from the pulley 187, the movable disc moves outwardly relative to the fixed disc 196, and the radius of the line of effective contact of the pulley with the belt, and therefore the speed of movement of the belt, is decreased.

The motor is rigidly secured to a slide 202 mounted on a slide base 203 by means of bolts 204. The slide base is rigidly secured by bolts 205 to a pair of channel members 206 and 207 which extend between the base angle members 84 and 85 and are rigidly secured thereto. The slide base has a recess 210 and internal side grooves 212 and 213 which open to the recess 210 in which are received the outwardly extending side flanges 214 and 215 of the slide. The grooves and the recess 210 open at the front end of the base toward the speed reducing assembly 180. The bottom surface 216 of the slide rests on the planar surface 217 of the slide base defining the bottom of the recess. The slide is movable on the base by a screw 218 which extends through a passage in the rear end of the base which opens to the recess 210. The screw is held against inward movement by the engagement of an annular stop shoulder 220, provided by its outer enlarged end portion with the rear end surface of the base and its outward movement is limited by the engagement of a collar 221 rigidly secured thereto with the surface 222 defining the rear end of the recess. The screw extends into the threaded bore 225 of the slide which preferably extends through the slide. The outer end of the screw is provided with a handle wheel 226. It will be apparent that when the screw is rotated in one direction, to move it further into the bore, the slide will be moved rearwardly on the slide base and when the screw is rotated in the opposite direction and unscrews from the bore, the slide will move forwardly on the slide base.

The apparatus 20 may be used to transport the pans P from a feed conveyor 230 to a pick-up conveyor 231. For example, the pans may be transported through an oven by the conveyor 230 to bake the raw dough carried thereby into rolls or other baked goods and must be transported to a pick-up conveyor 231 which moves the pans to a de-panning device, not shown, which removes the baked goods from the pans and it is necessary that the pans, whose longitudinal axes L—L extend transversely to their direction of travel while on the feed conveyor 230 must be rotated to a position wherein their longitudinal axes are parallel to their direction of travel for the proper operation of the de-panning device.

The speed of movement of the inner conveyor 40a about the axis of its curvature is set to exceed by a predetermined degree such movement of the outer conveyor. The feed conveyor, which may be of any suitable type having a substantially planar top support surface, moves the pans to the conveyors 40 and 40a and then moves downwardly about a suitable direction changing roller. The forward side S1 of a pan moves off the feed conveyor and the end bottom edges C1 and C2 of the pan move over the conveyors 40a and 40 and engage the edges 163 and 163a of one or two support members 116 and 116a and are supported thereby. The speed of movement of the upper portion of the outer conveyor 40 is preferably substantially equal to the speed of movement of the feed conveyor while the speed of movement of the inner conveyor 40a about the axis of curvature is greater than such speed of movement of the outer conveyor 40. As a result, the edges 163a of the support members 116a engaged by the end bottom edge C2 will now slide relative to the pan because of the relatively small frictional force therebetween because the frictional force due to the large area of contact of the rear portions of the bottom surface of the pan with the feed conveyor 230 holds the pan against movement relative to the feed conveyor. The pan continues to move forwardly without any rotation thereof until the bottom side edge C3 of the pan moves out of engagement with the feed conveyor at which time the pan is supported only by the conveyors 40 and 40a and moves therewith. The end bottom edge C1 is now in contact with the edges 163 of two of the support members 116 and the opposite bottom end edge C2 is now in contact with the edges 163a of two of the support members 116a. As he inner conveyor 40a is now moving forwardly relative to the outer conveyor, it will move the end E2 of the pan in a clockwise direction and in the direction of travel of the two conveyors. Such rotation of the pan continues as it is transported by the conveyors and when the pan moves to an intermediate position on the two conveyors, the locations of contact of the pan with the edges of the support members of the conveyors shift until only the side bottom edges C4 and C3 contact the edges of two support members 116 and 116a, respectively, since as the longitudinal axis L—L of the pan moves toward a position parallel to the direction of movement of the conveyors, the end bottom edges C1 and C2 move out of engagement with the support members. The pan rotates to a position where its longitudinal axis moves into direct parallel relationship with the direction of movement of the pick-up conveyor 231 and of the conveyors 40 and 40a at their front drive assemblies at the moment when the bottom end edge C2 engages the pick-up conveyor. The relative great force of frictional engagement of the pan and the pick-up conveyor now prevents further rotation of the pan even though the inner conveyor moves forwardly relative to the pan since the areas of contact of the pan with the inner conveyor are very small.

In the above description of the mode of operation of the apparatus 20, it was assumed that at any one instant the edges of two of the support members of each of the conveyors 40 and 40a were in contact with a bottom edge of the pan which would be the case if the pan were perfectly flat and if the edges of the support members of the two conveyors were located in conical planes. Since these conditions are rarely obtained in practice, the pan at various times during its transport by the conveyors 40 and 40a may engage the support edge of only one support member or of more than two of the support members of a particular conveyor. Since the areas of contact of the pan with the support members are always very small, even if more than two support members of a conveyor are contacted thereby, the pans are rotated during their transport by the conveyors to positions wherein the longitudinal axes of the pans are substantial parallel to the direction of travel of the pick-up conveyor 231 the time that the end E2 of the pan moves off the conveyors 40 and 40a and its bottom end edge C2 moves into engagement with the pick-up conveyor.

The relative difference in the speeds of the two conveyors necessary to obtain a desired predetermined rotation of articles varies with the dimensions of the articles and can be easily achieved by rotating the same during the trial transport of a few of the articles over the conveyors 40 and 40a, the variable speed pulley and the slide providing an infinite adjustment of the speed differential between the two conveyors over a predetermined range.

It will further be seen that, if desired, the speed of movement of the outer conveyor 40 about the center of the curvature of its upper portion 40 may be made greater than the speed of movement of the similar portion of conveyor 40a so that the rotation of the pan would be in a counter-clockwise direction, as seen from above, during its transport by the apparatus. The described mode of operation of the apparatus, wherein the inner conveyor has a greater speed of movement than the outer conveyor, is preferred since this requires less movement of the conveyors relative to the pans during their rotation thereof because the ends of the pan need move only a relatively short distance on the conveyors and because a smaller relative difference in the speeds of the two conveyors is required because the end of the pan nearer the centers of curvature of the conveyors is being rotated forwardly in the direction of movement of the upper portions of the conveyors. Or, if desired, the speed of movement of the outer conveyor about the center of curvature of its upper portion 40 may be made equal to the speed of movement of the similar portion of the conveyor 40a, so that the pan or other article being transported does not rotate with respect to the center line of the conveyor arc but is maintained in the same position with respect to the center line of the conveyor throughout the movement of the pan through the curved portion of the conveyor. Thus, the pan or other item being transported by the conveyor may be rotated in either direction with respect to the center line of the conveyors, or may be moved through a curve without changing the orientation of the pan with respect to the center line of the conveyor, all at the option of the operator, by varying the speed of movement of the conveyor portions 40 and 40a with respect to each other.

It will also be apparent that, if desired, the conveyors 40 and 40a could be so mounted as to have parallel straight, instead of arcuate, upper and lower portions of their paths of movement, or as to slope downwardly or upwardly in the direction of their movement so that the pans could be delivered by the apparatus at locations lower or higher than the locations at which the pans are delivered to the apparatus.

It will further be seen that while a particular means has been shown and described for varying the speed of movement of the conveyor 40, any suitable means may be employed for this purpose. For example, a variable speed motor could be employed and suitable speed controls therefor, or a variable speed transmission of a different type than that illustrated could be employed with a constant speed motor.

It will further be seen that while the operation of the apparatus was described in an installation where rectangular objects have to be rotated through a ninety degree angle during their transport by the apparatus, the apparatus may be used to transport articles of various configurations and rotate the articles through angles greater or smaller than ninety degrees, the degree of rotation depending on the speed differential between the conveyors and the length of the path of transport provided thereby.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A conveyor apparatus including: support means; a pair of conveyors mounted on said support means for movement in two spaced continuous paths of movement, said conveyors moving in the same direction in upper parallel portions of their paths of movement; and means for moving said conveyors at different speeds and relative to one another whereby the orientation of articles supported on said conveyors relative to their direction of transport by said apparatus may be varied during their transport by said conveyors, said conveyors having spaced support edges extending transversely of the direction of movement of the conveyors for supporting articles transported by said conveyors to minimize the areas of contact of said conveyors with the articles, the portions of said conveyors moving in the upper portions of their paths of movement being inclined inwardly and downwardly toward one another whereby only outer edge portions of articles being transported by said conveyors contact the conveyors.

2. The conveyor apparatus of claim 1, wherein said upper portions of the paths of movement are arcuate.

3. A conveyor apparatus including: support means; a pair of conveyors mounted on said support means for movement in two spaced continuous paths of movement, said conveyors moving in the same direction in upper parallel portions of their paths of movement; and means for moving said conveyors at different speeds and relative to one another whereby the orientation of articles supported on said conveyors relative to their direction of transport by said apparatus may be varied during their transport by the conveyors, the portions of the conveyors moving in the upper portions of their paths of movement being inclined inwardly and downwardly toward one another whereby only outer edge portions of articles being transported by said conveyors contact the conveyors.

4. The conveyor apparatus of claim 3, wherein said upper portions of the paths of movement are arcuate.

5. A conveyor apparatus including: support means; a pair of conveyors mounted on said support means for movement in two substantially parallel continuous paths of movement, said conveyors moving in the same direction in upper parallel portions of their paths of movement; means for moving said conveyors in said paths; and means for varying the speed of movement of one of said conveyors within a predetermined range whereby the degree of rotation of articles being transported by said conveyors may be adjusted by varying the speed of movement of one conveyor relative to the other, the portions of the conveyors moving in the upper portions of their paths of movement being inclined inwardly and downwardly toward one another whereby only outer edge portions of articles being transported by said conveyors contact the conveyors.

6. The conveyor apparatus of claim 5, wherein said conveyors have spaced support edges extending transversely of the direction of movement of the conveyors for supporting articles transported by said conveyors to minimize the areas of contact of said conveyors with the articles.

7. A conveyor apparatus including: a support frame; a first and a second drive assembly mounted on one end of said support frame and each having a rotatable sprocket means; first and second idler assemblies mounted on the other end of said frame and each having a rotatable sprocket means; a first conveyor having an endless draw member extending about and engaged with said sprocket means of said first drive assembly and said first idler assembly, said sprocket means of said first drive and idler assemblies having spaced axes of rotation; a second conveyor having an endless draw member extending about and engaged with said sprocket means of said second drive assembly and said second idler assembly, said sprocket means of said second drive and idler assemblies having spaced axes of rotation, said draw members having support members secured thereto which extend transversely to the direction of movement of said draw members; and drive means for rotating said sprocket means of said drive assemblies at different speeds whereby said conveyors may be caused to travel at different speeds and the orientation of articles supported on said conveyors relative to their direction of transport by said apparatus may be varied during their transport by said apparatus, said support frame including support means engageable by said support members disposed on opposite sides of said drive member and between said drive and idler assemblies for supporting said conveyors in upper and lower portions of their paths of movement about and between said drive and idler assemblies, each of said support members having side sections which extend divergently toward a draw member from an outer support edge of said support member which extends transversely relative to the draw member.

8. The conveyor apparatus of claim 7; and means for varying the speed of rotation of the sprocket means of one of said drive assemblies.

9. A conveyor apparatus including: a support frame; a pair of drive assemblies mounted on one end of said frame and having socket means rotatable about separate axes which extend convergently inwardly and downwardly from opposite sides of said frame; a pair of idler assemblies on the other end of said frame and having sprocket means rotatable about said axes which extend convergently inwardly and downwardly from the opposite sides of said frame; a first conveyor having an endless draw member disposed about and engageable with the sprocket means of one of said pair of drive assemblies and one of said pair of idler assemblies; a second conveyor having an endless draw member disposed about and engaging the other of said pair of drive assemblies and the other of said pair of idler assemblies, portions of said conveyors between said sprocket means of said drive and idler assemblies moving in parallel relationship in one direction between said drive and idler assemblies and sloping downwardly and inwardly toward each other; and drive means for rotating said sprocket means of said drive assemblies in the same direction at different speeds of rotation whereby said conveyors may be caused to travel at different speeds and the orientation of articles supported on said conveyors relative to their direction of transport by said apparatus may be varied during their transport by said apparatus.

10. The conveyor apparatus of claim 9, wherein said drive assembles are displaced from said idler assemblies transversely relative to the direction of movement of said conveyors whereby portions of said conveyors between said sprocket means move in arcuate parallel paths.

11. The conveyor apparatus of claim 10, and means operatively associated with said sprocket means of one of said drive assemblies for varying the speed of rotation thereof within a predetermined range.

12. The conveyor apparatus of claim 11, wherein said frame has guide means engageable with said draw members for guiding movement of said conveyors between said sprocket means of said drive and idler assemblies.

13. The conveyor apparatus of claim 12, wherein said conveyors include support members extending transversely relative to said draw members and wherein said support frame has support means extending between said sprocket means of said drive and idler assemblies and on opposite sides of said draw members for supporting said conveyors.

14. The conveyor apparatus of claim 9, and means operatively associated with said sprocket means of one of said drive assemblies for varying the speed of rotation thereof within a predetermined range.

15. A conveyor including: a draw member articulated at longitudinally spaced locations for pivotal movement above horiizontal and vertical axes; and a plurality of support members secured to said draw member, said support members having outer support edges which extend transversely relative to said draw member and planar side sections which slope divergently from said support edges toward said draw member.

16. The conveyor of claim 15, wherein said draw member at one side thereof below said support members has means slidably engageable with guide means which guide movement of said draw member in an arcuate path having a vertical center of curvature.

17. The conveyor of claim 15, wherein said side sections of said support members have inner transversely extending edges slidably engageable with support means extending longitudinally of said draw member and on opposite sides thereof.

18. A conveyor including: a draw member having a plurality of outer link assemblies and a plurality of inner link assemblies, each of said inner link assemblies being connected at opposite ends thereof to adjacent ends of adjacent outer link assemblies for pivotal movement relative thereto about vertical and horizontal axes, said outer link assemblies at one side of said draw member having vertically spaced horizontal flanges; means disposed between said horizontal flanges for engaging a guide means; and support members extending above and transversely relative to said draw member and secured to said outer link assemblies, said support members having outer support edges extending transversely relative to said draw member and planar side sections sloping divergently from said support edges toward said draw member.

References Cited

UNITED STATES PATENTS

| | | | |
|---|---|---|---|
| 2,652,143 | 9/1953 | Doren | 198—182 |
| 2,762,496 | 9/1956 | McCaul | 198—181 X |
| 3,047,123 | 7/1962 | McKay | 198—33 |
| 3,094,206 | 6/1963 | Stewart | 198—181 X |

EDWARD A. SROKA, *Primary Examiner.*

EVON C. BLUNK, *Examiner.*

A. C. HODGSON, *Assistant Examiner.*